US007917520B2

(12) United States Patent
Chi et al.

(10) Patent No.: US 7,917,520 B2
(45) Date of Patent: Mar. 29, 2011

(54) PRE-COGNITIVE DELIVERY OF IN-CONTEXT RELATED INFORMATION

(75) Inventors: Liang-yu (Tom) Chi, San Francisco, CA (US); Karon A. Weber, San Francisco, CA (US); Samantha Marie Tripodi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 794 days.

(21) Appl. No.: 11/635,443

(22) Filed: Dec. 6, 2006

(65) Prior Publication Data

US 2008/0140607 A1 Jun. 12, 2008

(51) Int. Cl.
G06F 17/30 (2006.01)
(52) U.S. Cl. ........................................ 707/751
(58) Field of Classification Search .............. 707/2, 706, 707/736, 751
See application file for complete search history.

(56) References Cited

U.S. PATENT DOCUMENTS

| 6,651,058 | B1* | 11/2003 | Sundaresan et al. ............. 707/6 |
| 7,149,776 | B1* | 12/2006 | Roy et al. ...................... 709/205 |
| 7,203,909 | B1* | 4/2007 | Horvitz et al. ................ 715/765 |
| 7,370,269 | B1* | 5/2008 | Prabhu et al. ................. 715/230 |
| 2004/0194150 | A1* | 9/2004 | Banker .......................... 725/135 |
| 2004/0249801 | A1* | 12/2004 | Kapur ............................. 707/3 |
| 2005/0033657 | A1* | 2/2005 | Herrington et al. ............. 705/26 |
| 2005/0262089 | A1* | 11/2005 | Wu .................................. 707/10 |
| 2006/0026013 | A1 | 2/2006 | Kraft |
| 2006/0104515 | A1* | 5/2006 | King et al. ..................... 382/190 |
| 2006/0167857 | A1 | 7/2006 | Kraft et al. |
| 2006/0277481 | A1* | 12/2006 | Forstall et al. ................. 715/764 |
| 2007/0073669 | A1 | 3/2007 | Kraft |
| 2007/0074102 | A1 | 3/2007 | Kraft et al. |
| 2007/0083429 | A1 | 4/2007 | Kraft |
| 2007/0106657 | A1 | 5/2007 | Kraft et al. |
| 2007/0212507 | A1* | 9/2007 | Arst et al. ..................... 428/40.1 |

OTHER PUBLICATIONS

U.S. Appl. No. 11/033,417, filed Jan. 10, 2005 for Kraft.
U.S. Appl. No. 11/033,100, filed Jan. 10, 2005 for Kraft.
U.S. Appl. No. 11/231,632, filed Sep. 20, 2005 for Kraft et al.
U.S. Appl. No. 11/232,270, filed for Nov. 10, 2005 Kraft et al.
U.S. Appl. No. 11/584,403, filed Oct. 19, 2006 for Kraft et al.

* cited by examiner

*Primary Examiner* — James Trujillo
*Assistant Examiner* — Jorge A Casanova
(74) *Attorney, Agent, or Firm* — James J. DeCarlo; Greenberg Traurig, LLP (57) ABSTRACT

An apparatus and method for providing pre-cognitive delivery of in-context related information is disclosed herein. A user's expressed interest in a particular portion of a requested page and his/her requests for additional information relating to the particular portion are tracked. The tracked data permits determination of the content of in-context related information. For each of the particular portions of the requested page deemed to be of sufficient popularity, in-context information relating to each such particular portion is automatically provided to users along with the requested page.

24 Claims, 6 Drawing Sheets

FIG. 1

- Lines generally denote text
- Boxes generally denote graphical content or a different content section of the page
- Box surrounding a line denotes highlighted text

FIG. 2

- Lines generally denote text
- Boxes generally denote graphical content or a different content section of the page
- Box surrounding a line denotes highlighted text

FIG. 3

- Lines generally denote text
- Boxes generally denote graphical content or a different content section of the page
- Box surrounding a line denotes highlighted text

- Lines generally denote text

PRE-COGNITIVE DELIVERY OF IN-CONTEXT RELATED INFORMATION

BACKGROUND OF THE INVENTION

The present invention relates to content provided in a networked environment. More particularly, the present invention relates to delivery of information relating to content provided in a networked environment.

When a page in a networked environment (e.g., a news article accessed using the Internet) is viewed by a reader, the page can include terms or concepts that are unknown to the reader. The reader may look-up one or more of these terms or concepts to improve comprehension of the page. For example, the reader may look-up a person's name to find out who the person is, or look-up a geographical region mentioned in the page to visually see the region located in a map.

To improve comprehension of the page, the page may include embedded links. The page is presented to the reader with at least a portion of the text of the page pre-configured as embedded links. The reader clicks on the embedded links to go to a related page or to initiate a keyword search based on the specified terms. For example, Yahoo's Y!Q permits contextual searching of pre-selected phrases in a page or of any phrase in a page. Pre-selected phrases in a page, referred to as highlighted LiveWord phrases, may be provided in a news article and have an icon next to each of the pre-selected phrases. When a person clicks on an icon, a contextual search occurs to provide web and news search results related to that pre-selected phrase. Alternatively, if the person's browser is configured with a Y!Q toolbar, then the person can highlight any phrase of any web page and a LiveWord icon will appear. Clicking on this icon will again initiate a contextual search of the highlighted phrase. In the case of pages pre-configured with embedded links, a single person (e.g., an editor) or a computer selects the terms that are likely to be unknown, confusing, or otherwise most suitable for additional exploration.

Unfortunately, pre-selected terms may not be the same terms that actual readers of the page may be confused about or would like to further explore. This may be due to the person or computer selecting the pre-selected terms not being a representative reader of the page. The pre-selected terms may represent an official view or a particular social/political/ideological view. Thus, when actual readers view the page, they may not find the embedded links to be useful. Instead, the actual readers may look-up other terms in the page. The same terms in the page may be looked-up repeatedly, once by each of a plurality of readers of the page.

Thus, it would be beneficial for a page provided in a networked environment to automatically provide additional information pertaining to terms or concepts within the page likely to be unknown or of further interest to readers. It would be beneficial for the automatically provided additional information to dynamically change over time in response to readers' indications of interest. It would be beneficial for content available to a plurality of persons to include information that would improve comprehension and usefulness of the content. It would be beneficial for human editor-designated related information in a page to be supplemented by community based related information, the community based related information reflecting the interests of actual readers of the page.

BRIEF SUMMARY OF THE INVENTION

One aspect of the invention relates to an apparatus and method for providing pre-cognitive delivery of in-context related information. A user's expressed interest in a particular portion of a requested page and his/her requests for additional information relating to the particular portion are tracked. The tracked data permits determination of the content of the in-context related information. For each of the particular portions of the requested page deemed to be of sufficient popularity, in-context information relating to each such particular portion is automatically provided to users along with the requested page.

By tracking identified confusion, curiosity, view, and interest of a plurality of readers of the same requested page, the system can intelligently and automatically provide supplemental and related information about specific terms or images in the requested page along with the requested page. The related information provided to subsequent readers is a function of the portion(s) of the requested page explicitly identified by the plurality of readers and the frequency of such identification.

Hence, comprehension of the requested page by future readers is increased. Using prior readers' interaction with the requested page also minimizes the need for an editor to decide (somewhat arbitrarily) what content within the page could benefit from supplemental information. Instead, embodiments of the present invention permit all readers of the requested page to be an editor, commentator, and/or guide about any part of the page to all subsequent readers.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

In the drawings, to easily identify the discussion of any particular element or art, the most significant digit or digits in a reference number refer to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION OF THE PREFERRED EMBODIMENTS

Described in detail below is an apparatus and method for automatically providing in-context related information for content accessed in a networked environment. The displayed page includes the accessed content and the in-context related information. The in-context related information is pre-cognitive information that is provided prior to a request for the information by a person. The in-context related information is dynamically configured. The in-context related information changes over time in response to the inquiry actions of a community of persons requesting the content.

Inquiry actions (e.g., searches and/or click paths) relating to at least a portion of the content (e.g., specific terms, graphics, images, or indicia within the content) are tracked and analyzed. Inquiry actions relating to these portions of the content indicate the terms or concepts also likely to be confusing or of further interest to future persons who access the content. Thus, information relating to these terms or concepts is automatically provided along with the content when the content is subsequently accessed to facilitate comprehension of the accessed content.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1:
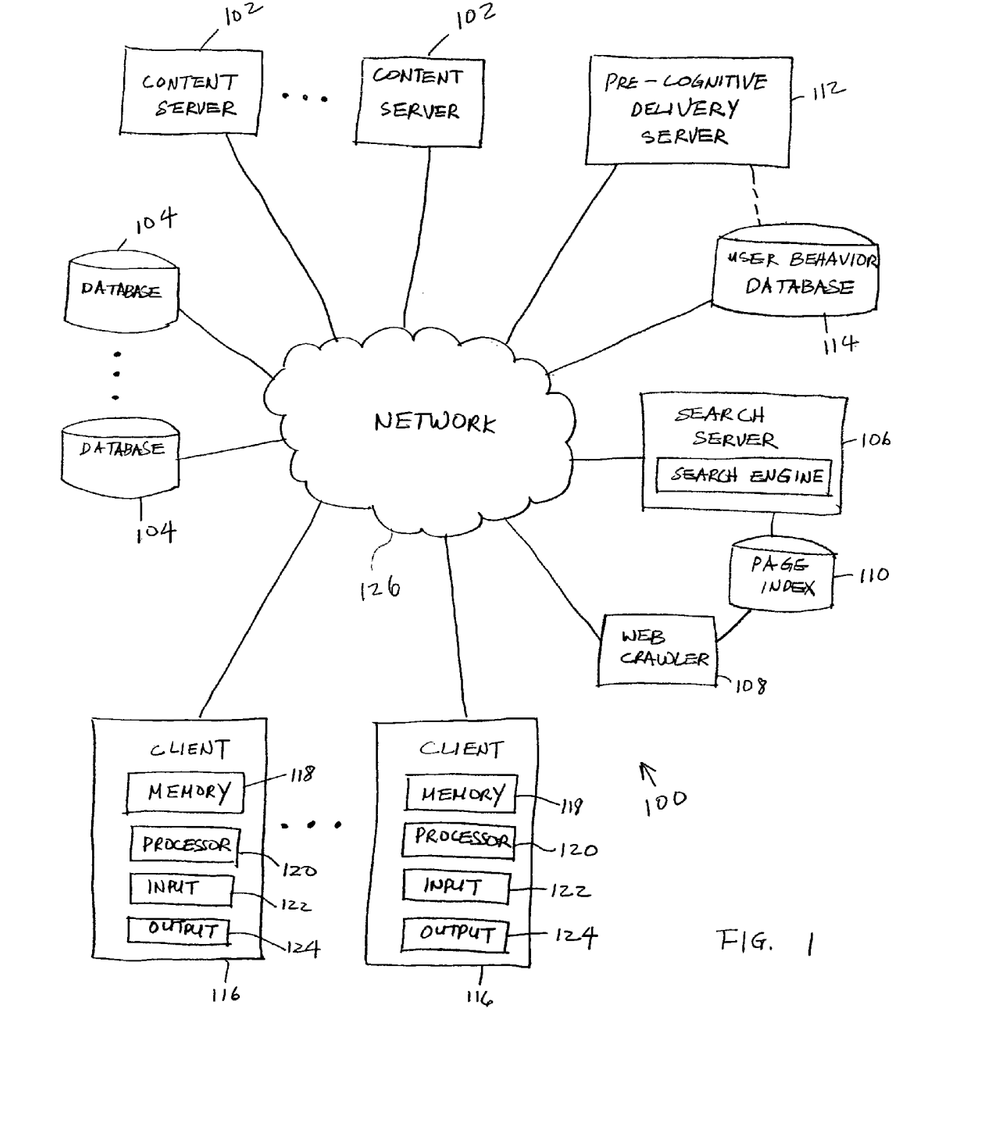
FIG. 1 is a block diagram of one embodiment of a-system for providing pre-cognitive delivery of in-context related information.

Referring to FIG. 1, a block diagram of one embodiment of a system 100 for providing pre-cognitive delivery of in-context related information is shown. The system 100 includes a plurality of content servers 102, a plurality of databases 104, a search server 106, a web crawler 108, a page index database 110, a pre-cognitive delivery server 112, a user behavior database 114, a plurality of client devices 116, and a communications network 126. Each of the content servers 102, databases 104, search server 106, web crawler 108, pre-cognitive delivery server 112, user behavior database 114, and client devices 116 is in communication with the network 126. Each of the content servers 102, databases 104, search server 106, web crawler 108, page index database 110, pre-cognitive delivery server 112, user behavior database 114, and client devices 116 can be located at the same or different locations relative to each other.

The content servers 102 are host servers operable to provide content to client devices 116 via the network 126. The servers 102 host web sites (or web pages) and include data and media content. The databases 104 are operable to store data associated with the servers 102, search server 106, pre-cognitive delivery server 112, and/or client devices 116. For example, the databases 104 can include databases of images, advertisement data, and/or web page layouts or templates. The databases 104 communicate with the servers 102, search server 106, web crawler 108, pre-cognitive delivery server 112, user behavior database 114, or client devices 116 via the network 126.

Alternatively, the servers 102 may include the databases 104, processors, switches, routers, interfaces, and other components and modules. There may be more or less than two servers 102, depending on computational and/or distributed computing requirements. The servers 102 may be located at different locations relative to each other. The databases 104 may also be directly connected to the servers 102. There may be more or less than two databases 104, depending on computational and/or distributed computing requirements.

In one embodiment, the web crawler 108 (also referred to as a spider, bot, or crawler) includes algorithms to classify (and rank) every page or representative pages on searchable web sites. The web crawler 108 is configured for manual, semi-automatic, or automatic "reading" of the pages. The pages "read" by the web crawler 108 are cataloged into one or more page indexes, such as the page index database 110. The page index database 110 can include pages, hypertext links to pages, data representing content of indexed pages, etc.

The search server 106 is operable to perform search requests (also referred to as query requests, inquiry requests, or look-up actions) and provide search results. The search server 106 includes various modules, programs, algorithms, and/or units for executing the search requests, including, but not limited to, a search engine (also referred to as a query response module or program) and search results categorization algorithms. The search server 106 can also include advertisement data and/or web page layouts or templates for use in configuring the search results.

When the search server 106 receives a search request from any of the client devices 116, the search server 106 includes search related algorithms or modules for identifying and ranking web pages relative to the query terms. The search server 106 interfaces with the page index database 110 to identify which pages or content associated with pages will comprise the search results. The search server 106 includes a ranking algorithm to rank the identified search results.

Although the search server 106, web crawler 108, and page index database 110 are illustrated as separate components, in an alternative embodiment the search server 106, web crawler 108, and page index database 110 may be implemented as a single component or system. For example, the search engine can comprise a coordinated set of programs that include a spider program, a program that generates a page index, and a program that returns search results in response to a search request. The spider program "reads" every page or representative pages of searchable web sites. The indexing program generates an index from the pages "read" by the spider program. The program that returns search results compares the search request to entries in the index to identify the most relevant matches and possibly also ranks the identified matches.

The pre-cognitive delivery server 112 is operable to provide pre-cognitive delivery of in-context related information to the client devices 116. The pre-cognitive delivery server 112 is operable to match, configure, and format user requested content/page with appropriate in-context related information. The user requested content/page can be provided from the pre-cognitive delivery server 112, servers 102, or databases 104. The pre-cognitive delivery server 112 tracks (and analyzes) user actions (e.g., query histories, tags, and session logs) for each of the accessed content/page and stores user action information at the user behavior database 114.

Each of the client devices 116 (also referred to as clients) includes a memory 118, a processor 120, an input device 122, and an output device 124. The client devices 116 may be a general purpose computer (e.g., a personal computer). Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented as the client devices 116. The client devices 116 include one or more applications, program modules, algorithms and/or sub-routines. As an example, the client devices 116 may include a browser application (e.g., Internet Explorer, Firefox, etc.) and a graphical user interface (GUI) to access and interact with pages and content provided by the servers 102, databases 104, search server 106, and/or pre-cognitive delivery server 112. The system 100 may include more or less than two client devices 116. The client devices 116 may be remote from each other.

The network 126 is a communications network, such as a local area network (LAN), a wide area network (WAN), or the Internet. When the network 126 is a public network, security features (e.g., VPN/SSL secure transport) may be included to ensure authorized access within the system 100.

Figure 2:
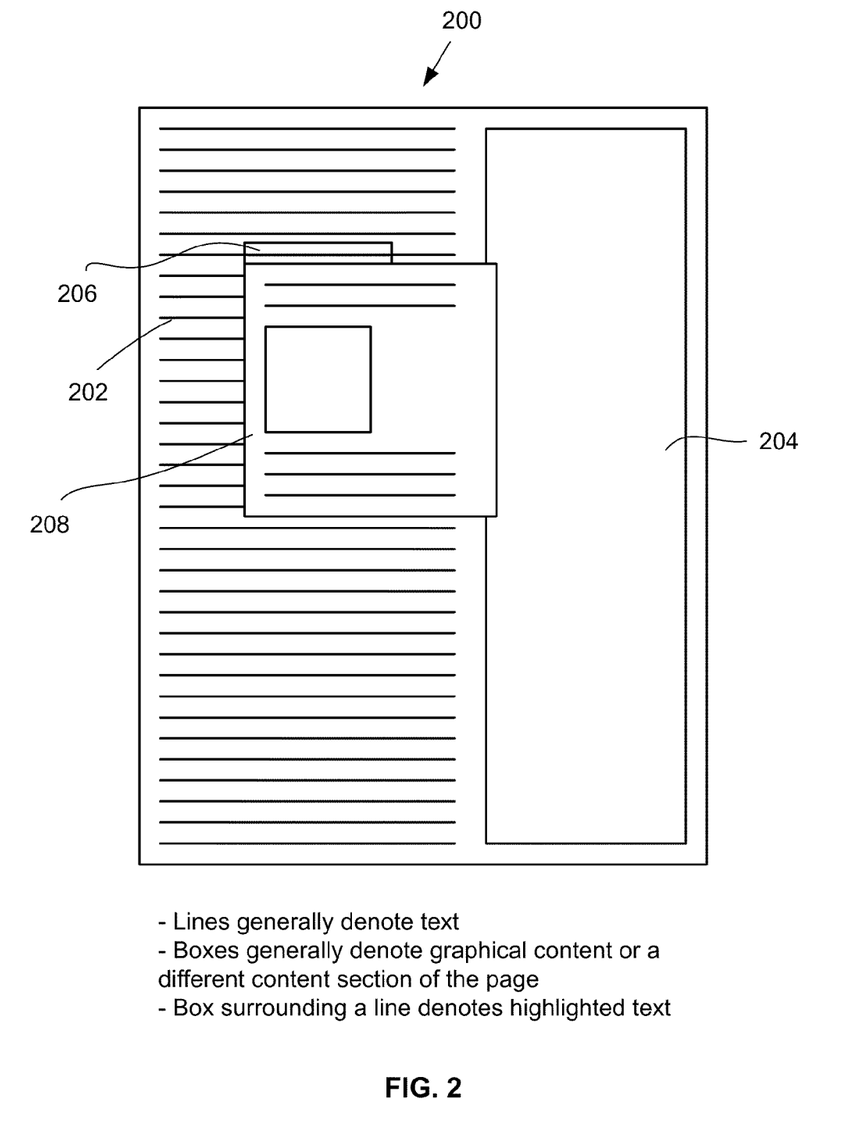
FIG. 2 is an example of first display of a requested page.
Figure 3:
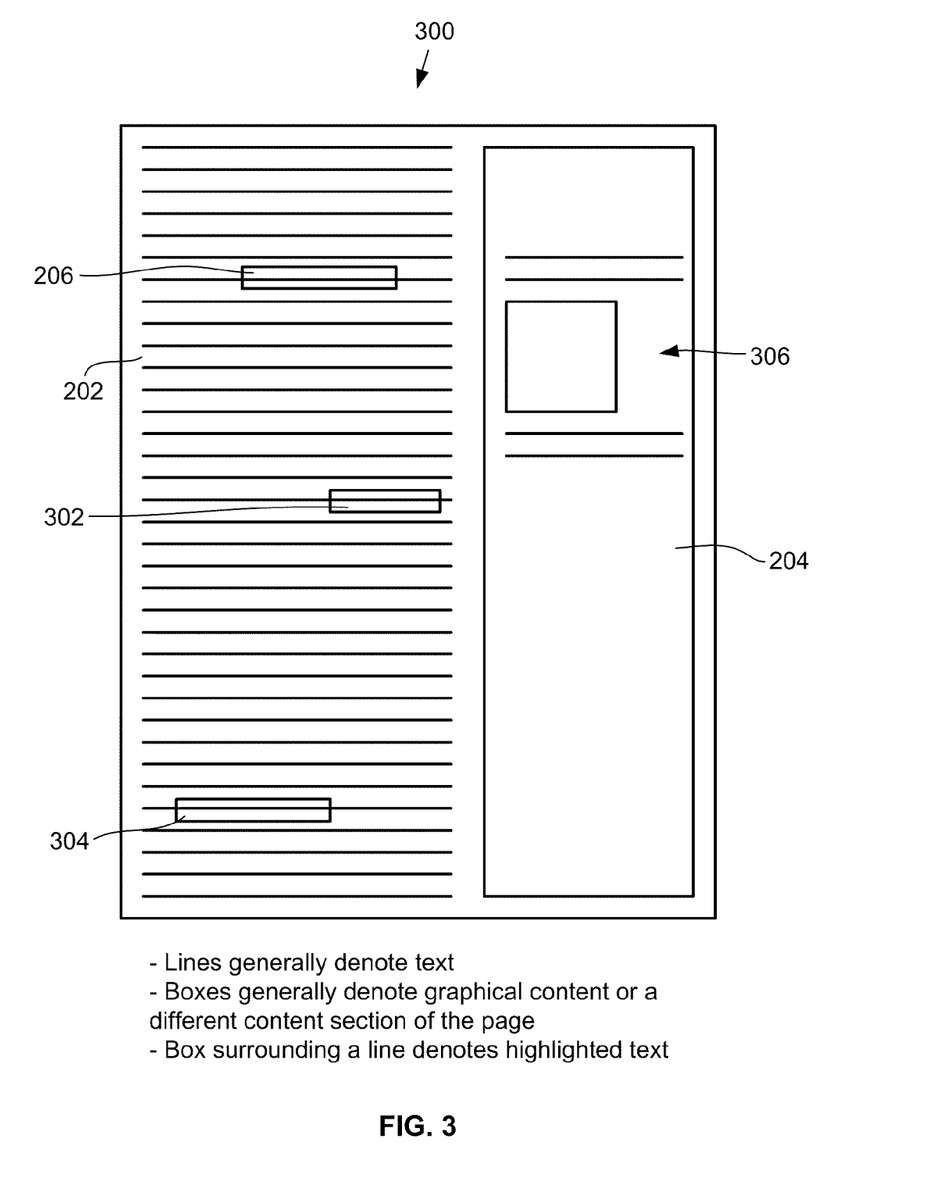
FIG. 3 is an example of a subsequent display of the requested page of FIG. 2 with pre-cognitive in-context related information.
Figure 4:
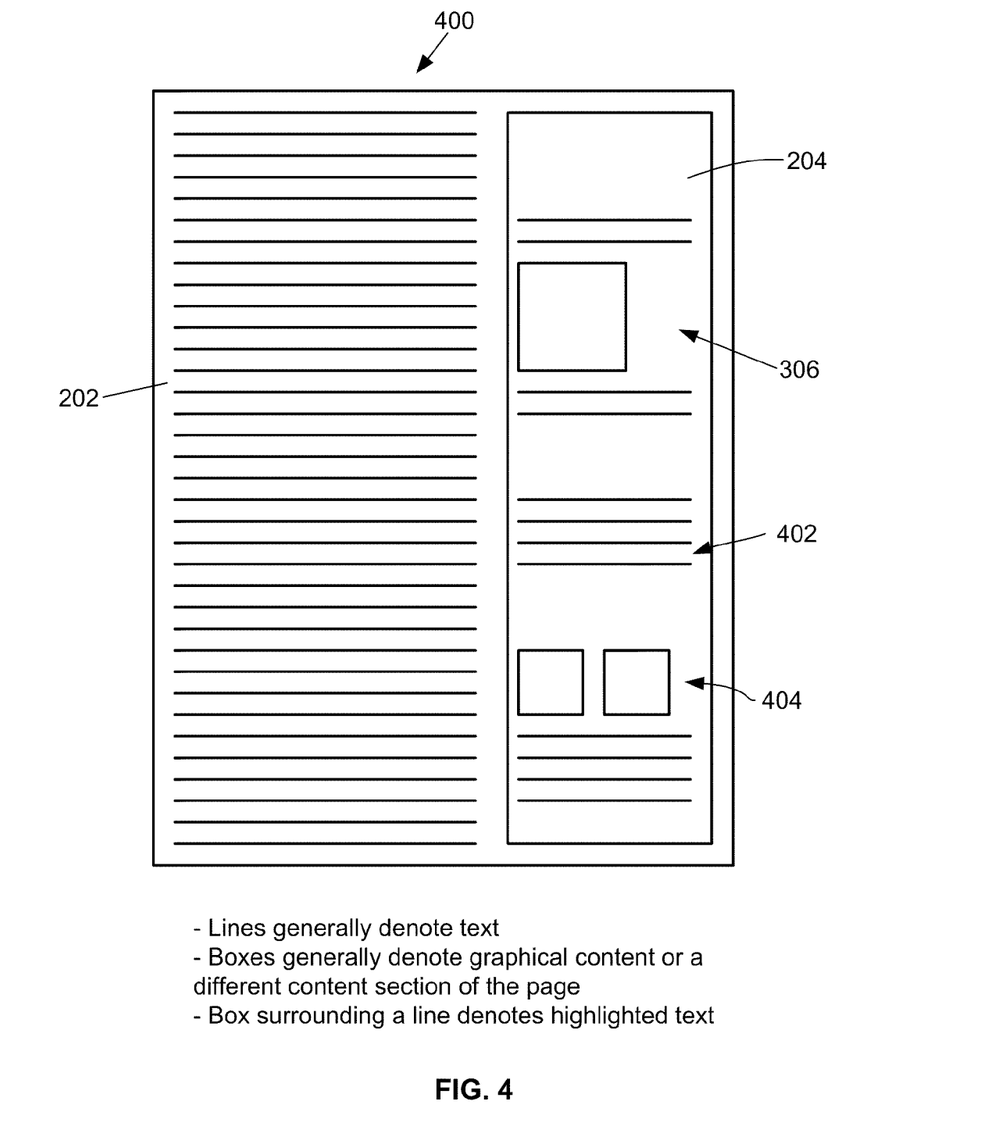
FIG. 4 is an example of a subsequent display of the requested page of FIG. 3 with additional pre-cognitive in-context related information.

Referring to FIGS. 2-4, an example of identical content successively accessed by a plurality of persons is shown with the dynamically configured pre-cognitive related information. FIG. 2 illustrates a particular content or page that is accessed and displayed for the first time at one of the client devices 116. A page 200 comprises a user requested content section 202 (also referred to as a first panel or content panel) and a related information section 204 (also referred to as a second panel, related information panel, or pre-cognitive content panel). As an example, the user requested content section 202 comprises a news article, term definitions, maps, related links, photographs, biographies etc. The user requested content section 202 can comprise a variety of textual and/or graphical content, such as, but not limited to, text, audio, video, animation, graphics, images, time-based media, etc. The related information section 204 includes no content because there are no look-ups (and user interactions) with respect to the user requested content section 202 from which to determine the related information to be displayed.

FIG. 3 illustrates the user requested content section 202 accessed at a later point in time than in FIG. 2. This later access is shown as a page 300. The related information section 204 now automatically provides related information that is in context with the previous users' interaction with the user requested content section 202. The page 300 can be accessed by the same person that previously accessed the page 200, accessed at the same client device 116 that accessed the page 100, accessed by a different person, or accessed at a different client device 116.

FIG. 4 illustrates the user requested content section 202 accessed at a later point in time than in FIG. 3. This later access is shown as a page 400. The related information section 204 includes different and/or additional content than in the related information section 204 of the page 300, because there is more user interaction information to draw upon. The page 400 can be accessed by the same person that accessed either the page 100 or 200, accessed at the same client device 116 that accessed either the page 100 or 200, accessed by a different person, or accessed at a different client device 116. The pages 200, 300, 400 can be accessed by completely unrelated people, at different geographic locations, and/or at different times/days/weeks/years. The community of readers of the page is dynamic, defined by those who access the page.

Figure 5:
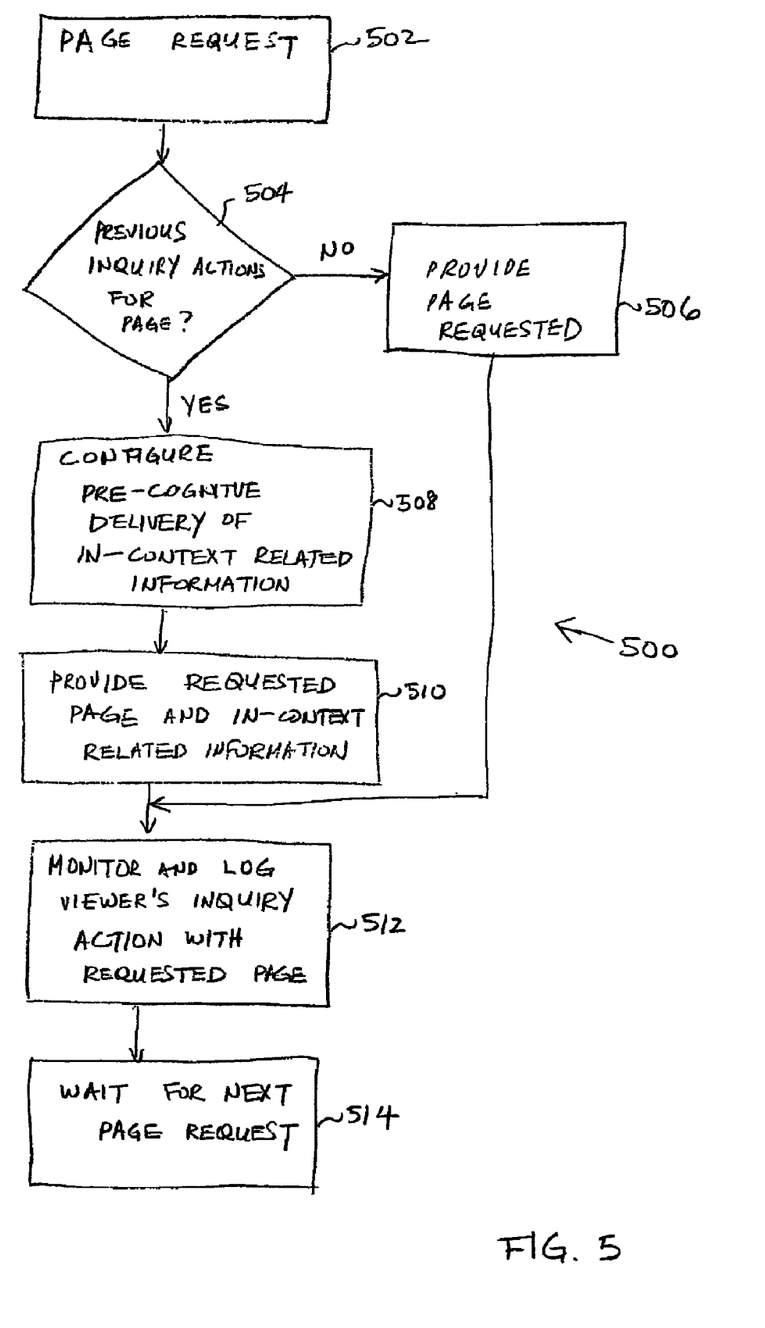
FIG. 5 is a flow diagram of one embodiment of pre-cognitive delivery of in-context related information.

Referring to FIG. 5, one embodiment of a flow diagram 500 for pre-cognitive delivery of in-context related information is shown. The flow diagram 500 includes a page request receipt block 502, a check for previous inquiry actions block 504, a provide page requested block 506, a configure pre-cognitive information block 508, a provide page requested with pre-cognitive information block 510, a monitor inquiry actions block 512, and a wait for next page request block 514.

When a particular content or page is requested from one of the clients 116, the request is received by at least the content servers 102 (block 502). The content servers 102 and/or the pre-cognitive delivery server 112 checks to see if the requested page was previously viewed and whether inquiry actions associated with the page exist (block 504). If there are no previous inquiry actions for the page, the requested page is displayed without content in the related information section 204 (block 506). The page 200 is an example of a requested page with no previous inquiry actions associated with it. The related information section 204 of the page 200 is empty. In another embodiment, the related information section 204 may be omitted when there is no in-context information to display.

Particular text and/or graphics included in the user requested content section 202 of the page 200 may be associated with embedded links, hyperlinks, links for automatically initiated searches, and/or dropdown additional information boxes. The association may be pre-configured by a provider of the page, or the page 200 may be configured for user interactivity such that a reader may highlight any text and/or graphics and specify a request for additional information. An example of freeform searching of any text and/or graphics included in a page is disclosed in U.S. Published Application No. 2006-0026013, which is incorporated herein by reference. For example, the viewer of the page 200 has requested interest in a particular text 206, and in response, an additional information box 208 is provided. The additional information box 208 may comprise a search driven look-up based on the particular text 206 and context.

An inquiry action comprises an express interest by a person of a portion of the user requested content section 202 and, in some cases, also an express request for additional information relating to that specified portion. For example, if the user requested content section 202 already includes pre-selected phrases (e.g., each of particular text 206, 302, 304 is an embedded link or Y!Q LiveWord phrase), then a person clicking on a particular embedded link or Y!Q icon is sufficient to constitute an inquiry action. The system 100 recognizes the clicking action as specifying a phrase of interest and also that additional information is requested about that phrase. As another example, if the user requested content section 202 does not include pre-selected phrases but the client 116 includes a toolbar or other user interface for initiating a search, then a person highlighting a phrase within the user requested content section 202 and clicking (or otherwise initiating) a search request using the toolbar or user interface would constitute an inquiry action. As yet another example, if the person typed in a phrase appearing in the user requested content section 202 into a toolbar or user interface and requested information related to this phrase, the system 100 may consider it to be an inquiry action. Each of the above embedded link, LiveWord phrase, highlighted phrase, and typed-in phrase may be the particular text 206, which upon being specified by the reader of the page, cause associated pre-cognitive information 306 to be generated.

If the person expresses interest in a still image or time-based media (some form of non-textual information), the system 100 is capable of utilizing tags (such as text tags and metadata) for the still image or time-based media to obtain content. It is also contemplated that the system 100 may derive content information from the still image or time-based media itself, without use of associated tags. This obtained content may directly populate the related information section 204 or indirectly populate the related information section 204 via a search or look-up performed using the obtained content.

On the other hand, if there are previous inquiry actions for the requested page, then pre-cognitive information 306 to include in the related information section 204 is configured and/or accessed (block 508). At the block 510, the requested page is displayed with the pre-cognitive information 306. The pages 300 and 400 are representative of the same page viewed by and inquiry actions noted from a plurality of persons. For example, in the page 300, the particular text 206 has been "looked up" fifty times by successive persons viewing the page. A second particular text 302 has been "looked up" four times. A third particular text 304 has been "looked up" twelve times. Thus, over time, popular look-ups within the page 300 are known, and pre-cognitive information associated with these popular look-ups can be provided to the viewer before the current viewer even thinks to look them up. In the page 400, pre-cognitive information 306, 402, and 404 for particular text 206, 302, and 304, respectively, are automatically provided.

Pre-cognitive information 306, 402, 404 comprises a variety of media. For example, each of the pre-cognitive information can comprise one or more of, but is not limited to, a web page, definition, map, text, excerpted text, image, video, animation, photograph, audio, time-based media, etc. It can comprise any information available to the system 100 that may further a reader's understanding of at least a portion of the user requested content section 202.

Although not shown, statistical information relating to particular text 206, 302, 304 and/or pre-cognitive information 306, 402, 404 can be included in each of pages 300, 400. For example, the number of hits (or look-up) of each of the particular text 206, 302, 304 can be indicated. As another example, the percentage of hits relative to total number of readers of the page can be indicated. The statistical information provides data indicative of the relevance of the corresponding pre-cognitive information provided in the related information section 204.

At the block 512, monitoring of viewer interest in particular portions of the requested page continues. The system 100 monitors, tracks, logs, and analyzes which particular portions of the requested page are of interest to viewers and when viewers request additional information about each such particular portions of the requested page. In one embodiment, the related information section 204 may be updated in real-time for a requested page that is currently displayed at a client 116, based on the viewer's interaction and other current viewers' interaction of the page. In another embodiment, the related information section 204 may not update after original presentment with the requested page. At the block 514, the system waits for the next page request.

The in-context related information provided in the related information section 204 for a given requested page changes over time based on additional viewer interest behavior. Both the particular text and/or graphics within the requested page that viewers initiate additional information request for (e.g., particular text 206, 302, 304) as well as the frequency of viewer interest in each of these particular text and/or graphics (e.g., fifty times for particular text 206, four times for particular text 302, etc.) are saved. Moreover, the change in frequency of viewer interest for a particular text and/or graphic may be logged over time. For example, if look-ups of particular text 206 decreases later in the day, perhaps because the associated in-context related information provided in the related information section 204 is sufficient for later viewers to not perform a look-up, then the in-context related information 306 may remain in the related information section 204 but move to the bottom of the page or become abbreviated. As another example, the order of the in-context related information may change over time, perhaps in response to change in frequency of look-ups. As still another example, although the related information section 204 is illustrated as a side bar or side panel in FIGS. 2-4, it may alternatively be provided on the bottom, top, or middle section of the requested page, as a pop-up page, or as a lens.

Pre-cognitive delivery of in-context related information makes the requested page "smarter" and more helpful as more viewers read and interact with it. Terms, graphics, or content that may be confusing to a number of people may automatically be defined without a reader having to request additional information. The format of each of the in-context related information need not be the same for each of its associated particular text. A number of different format templates may exist. As shown in FIG. 4, the information 306 and 404 include text and graphic while the information 402 is merely text based. The in-context related information may comprise text, graphics, still or moving images, hyperlinks, excerpts of another page, etc. The in-context related information may be content that is pre-configured in the pre-cognitive delivery server 112 and/or databases 104. For example, the term "Uganda" is pre-defined/pre-configured with a map of Uganda and descriptive text. The name "Abraham Lincoln" is pre-defined with a picture and short biography. Alternatively, the in-context related information may be configured dynamically by running a search and extracting content from the most relevant search results.

Figure 6:
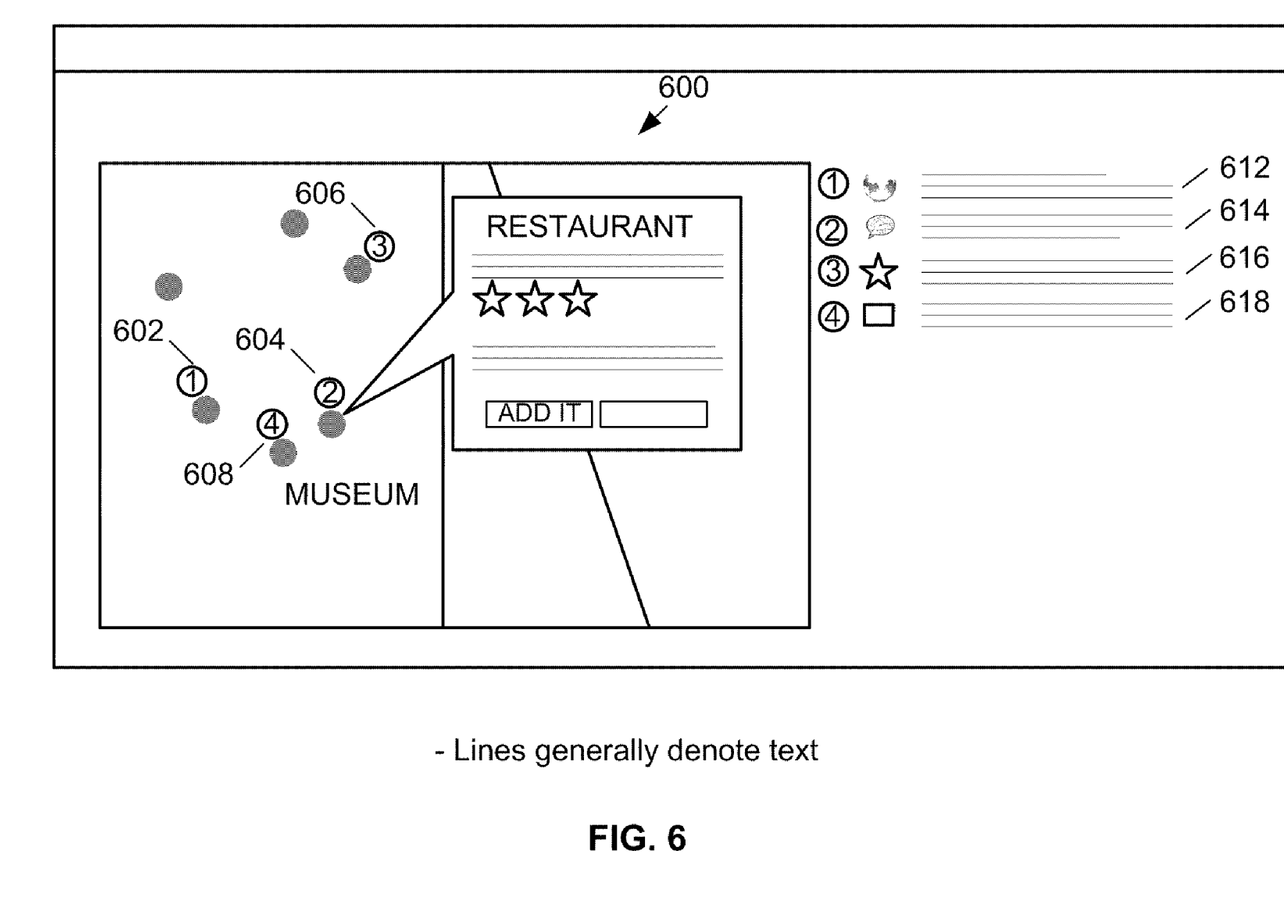
FIG. 6 is an example of a map including pre-cognitive in-context related information.

In FIG. 6, another example of accessed content including pre-cognitive delivery of in-context related information is shown. A map 600 identifies locations of interest, any of which a person can click on or mouse-over to obtain additional information. As more people access the map and express interest or look-up the same locations of interest, the in-context related information for those locations of interest will start to populate the side panel. For example, if locations 602, 604, 606, and 608 are the most frequently looked up locations in the map 600, then in-context related information 612, 614, 616, and 618, respectively, will be provided alongside the map 600.

Thus, any content that is accessed over a networked environment can be made "smarter" and include the community's confusion, curiosity, views, and interest by monitoring and logging viewers' look-up and interaction with the accessed content. This monitored information can then be used to automatically provide pre-cognitive delivery of in-context related information in a side panel along with the accessed content.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

The terms "computer program product," "computer-readable medium," and the like may be used generally to refer to media such as, for example, database 104, user behavior database 114, pre-cognitive delivery server 112, or memory 118. These and other forms of computer-readable media may be involved in storing one or more sequences of one or more instructions for use by content server 102, pre-cognitive delivery server 112, or processor 120, to perform specified operations. Such instructions, generally referred to as "computer program code" (which may be grouped into the form of computer programs or other groupings), when executed, enable the system 100 to perform features or functions of embodiments of the present invention. Note that the code may directly cause the processor to perform specified operations, be compiled to do so, and/or be combined with other software, hardware, and/or firmware elements to do so.

Moreover, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method comprising:
    monitoring, by a computing device, indications of interest content appearing in at least a portion of a requested page by a user, the monitoring comprising tracking interest expressed in the content portion of the requested page, and tracking a request for additional information about the content portion of the requested page by the user;
    automatically configuring, by the computing device, in-context information relating to the content portion of the requested page based on the monitored indications of interest, wherein the automatically configured in-context information is not included in the requested page; and
    providing, by the computing device, the requested page and the automatically configured in-context information for adjacent display in response to a subsequent user request for the requested page, without subsequent user input of interest in at least the portion of the requested page.

2. The method of claim 1, wherein the user's request for additional information includes clicking on a hyperlink, clicking on an embedded link, requesting a search, or accessing a dropdown box.

3. The method of claim 1, wherein automatically configuring in-context information relating to the portion of the requested page comprises automatically configuring the in-context information when there is sufficient indications of interest for the portion of the requested page.

4. The method of claim 1, wherein the portion of the requested page comprises at least one of text, image, video, and audio.

5. The method of claim 1, wherein the requested page comprises a periodical article.

6. The method of claim 1, wherein monitoring indications of interest comprises monitoring indications of interest by a plurality of users.

7. The method of claim 1, wherein monitoring indications of interest comprises monitoring past indications of interest.

8. The method of claim 1, further comprising dynamically updating the automatically configured in-context information at a client site when automatically configuring in-context information relating to the portion of the requested page changes while the requested page and the automatically configured in-context information are displayed at the client site.

9. The method of claim 1, wherein the in-context information is representative of an inquiry for additional information about the portion of the requested page by a community of users viewing the requested page.

10. A computer-readable storage medium comprising instructions for execution by a computing device, the instructions comprising:
    tracking requests for information relating to a first portion of a requested page, the tracking comprising tracking interest expressed in the first portion of the requested page by a user, and tracking a request for additional information about the first portion of the requested page by the user;
    automatically configuring in-context information relating to the first content portion of the requested page based on the tracked requests for information, wherein the automatically configured in-context information is not included in the requested page; and
    providing the requested page and the automatically configured in-context information for adjacent display in response to a subsequent user request for the requested page, without subsequent user input of interest in the first portion of the requested page.

11. The computer-readable storage medium of claim 10, further comprising:
    tracking requests for information relating to a second portion of the requested page;
    automatically configuring in-context information relating to the second portion of the requested page based on the tracked requests for information; and
    providing the requested page and the automatically configured in-context information for the first and second portions for simultaneous display, wherein the automatically configured in-context information for the first and second portions are displayed in the same area relative to each other and in a different area relative to the requested page.

12. The computer-readable storage medium of claim 10, wherein tracking requests for information comprises identifying a frequency of requests for information relating to the first portion of the requested page.

13. The computer-readable storage medium of claim 10, wherein the first portion of the requested page comprises text.

14. The computer-readable storage medium of claim 10, wherein the first portion of the requested page comprises an image.

15. The computer-readable storage medium of claim 10, wherein the first portion of the requested page comprises time-based media.

16. The computer-readable storage medium of claim 10, wherein the requested page comprises a periodical article.

17. The computer-readable storage medium of claim 10, wherein the requested page comprises a map.

18. The computer-readable storage medium of claim 10, wherein tracking requests for information relating to a first portion of a requested page comprises tracking requests for information from a plurality of users.

19. The computer-readable storage medium of claim 10, wherein the in-context information is representative of an inquiry for additional information about the first portion of the requested page by a community of users viewing the requested page.

20. A computing device comprising:
    a processor;
    a storage medium for tangibly storing thereon program logic for execution by the processor, the program logic comprising:
    receiving logic executed by the processor for receiving a request for content from a user;
    monitoring logic executed by the processor for monitoring indications of interest content appearing in at least a portion of the requested page, the monitoring logic comprising logic to track interest expressed in the content portion of the requested page and track a request for additional information about the content portion of the requested page by the user;

determining logic executed by the processor for determining presentment of first in-context information along with the requested content based on frequency of users specifying interest in a first particular portion of the requested content; and providing logic executed by the processor for automatically providing the requested content and the first in-context information for concurrent display in response to a subsequent user request for the requested page, wherein the first in-context information relates to the first particular portion of the requested content and the first in-context information is not included in the requested content, and wherein the subsequent user does not express interest in the first particular portion of the requested content.

21. The computing device of claim 20, further comprising logic executed by the processor for:

determining presentment of second in-context information along with the requested content based on frequency of users specifying interest in a second particular portion of the requested content; and automatically providing the requested content and the second in-context information for simultaneous display, wherein the second in-context information relates to the second particular portion of the requested content.

22. The computing device of claim 20, wherein the requested content comprises a periodical article.

23. The computing device of claim 20, wherein the requested content comprises a map.

24. The computing device of claim 20, wherein one of the requested content and the first in-context information comprises at least one of text, image, and time-based media.

* * * * *